US008834768B2

(12) United States Patent
Oota (10) Patent No.: US 8,834,768 B2
(45) Date of Patent: Sep. 16, 2014

(54) PROCESS AND FACILITY FOR MANUFACTURING FOAM MOLDED RESIN ARTICLES (75) Inventor: Masato Oota, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 53 days.

(21) Appl. No.: 13/390,622

(22) PCT Filed: Aug. 19, 2010

(86) PCT No.: PCT/JP2010/063961
§ 371 (c)(1),
(2), (4) Date: Feb. 15, 2012

(87) PCT Pub. No.: WO2011/021651
PCT Pub. Date: Feb. 24, 2011

(65) Prior Publication Data
US 2012/0139145 A1    Jun. 7, 2012

(30) Foreign Application Priority Data

Aug. 19, 2009 (JP) ................................. 2009-190280

(51) Int. Cl.
B29C 39/10 (2006.01)
B29C 33/58 (2006.01)
B29C 44/38 (2006.01)
B29C 33/14 (2006.01)

(52) U.S. Cl.
CPC ............ B29C 33/58 (2013.01); B29C 44/388 (2013.01); B29C 39/10 (2013.01); B29C 33/14 (2013.01); Y10S 425/817 (2013.01)
USPC ......... 264/275; 264/46.4; 264/46.5; 264/250; 264/255; 264/259; 264/263; 264/265; 264/271.1; 264/277; 425/507; 425/508; 425/403; 425/817 R; 425/127

(58) Field of Classification Search
CPC ........ B29C 39/10; B29C 39/26; B29C 39/38; B29C 33/12; B29C 33/14; B29K 2105/04; B29L 2131/58
USPC ..................... 425/507, 508, 403, 817 R, 127, 425/DIG. 110; 264/46.4, 46.5, 250, 255, 264/259, 263, 265, 271.1, 275, 277, 264/DIG. 64, DIG. 65
See application file for complete search history.

(56) References Cited

U.S. PATENT DOCUMENTS 4,820,372 A * 4/1989 Gidseg ........................ 156/356
5,855,709 A * 1/1999 Bocoviz et al. .............. 156/84
(Continued)

FOREIGN PATENT DOCUMENTS

JP    06-091662 A    4/1994
JP    07-112444 A    5/1995
(Continued)

OTHER PUBLICATIONS

Kojima et al., "Mechanical Properties of Nylon 6-Clay Hybrid", Toyota Central Research & Development Labs, Jan. 22, 1992.*

(Continued)

Primary Examiner — Joseph S Del Sole
Assistant Examiner — Lawrence D Hohenbrink, Jr.
(74) Attorney, Agent, or Firm — Sughrue Mion, PLLC (57) ABSTRACT A process and a facility for manufacturing foam molded resin articles are provided which facilitate for a secondary material at least partially formed of a synthetic resin to be arranged so as to extend along a curved surface of a mold inner surface, and further to be released from the mold after molding.

8 Claims, 3 Drawing Sheets

(56) References Cited

U.S. PATENT DOCUMENTS

| | | | |
|---|---|---|---|
| 6,116,684 A * | 9/2000 | Williams | 297/214 |
| 7,445,686 B2 * | 11/2008 | Gager et al. | 156/212 |
| 2005/0269725 A1 * | 12/2005 | Kubota | 264/51 |
| 2006/0263551 A1 * | 11/2006 | Tomeo | 428/34.1 |

FOREIGN PATENT DOCUMENTS

| | | | |
|---|---|---|---|
| JP | 11-127915 A | 5/1999 | |
| JP | 2000-289029 A | 10/2000 | |
| JP | 2003-011137 A | 1/2003 | |
| JP | 2006-062205 A | 3/2006 | |
| JP | 2006-205643 A | 8/2006 | |

OTHER PUBLICATIONS

Kawaguchi, "The Dynamic Mechanical Properties of Nylons", Research Department, Toyo Rayon Co., Oct. 20, 1958.*

International Search Report of PCT/JP2010/063961, dated Oct. 19, 2010.

* cited by examiner

PROCESS AND FACILITY FOR MANUFACTURING FOAM MOLDED RESIN ARTICLES

CROSS REFERENCE TO RELATED APPLICATIONS

This application is a National Stage of International Application No. PCT/JP2010/063961 filed Aug. 19, 2010, claiming priority based on Japanese Patent Application No. 2009-190280 filed Aug. 19, 2009 the contents of all of which are incorporated herein by reference in their entirety.

TECHNICAL FIELD

The present invention relates to a process and a facility for manufacturing a foam molded resin article combined with a secondary material in one unit by foaming a foamable resin material within a mold in which the secondary material has been arranged along an inner surface of the mold.

BACKGROUND ART

Seats such as vehicle seats and indoor sofas are made up of a seat pad that is composed of, for example, a polyurethane foam and a skin material that is attached on a surface of the seat pad. A skin material is fixed onto a surface of a seat pad by a method in which a fastener such as a hook-and-loop fastener is provided on a surface of a seat pad and the skin material is fixed onto the surface of the seat pad through this fastener. Such a fastener is arranged along an inner surface of a seat pad molding mold and a foamable resin material such as urethane is foamed within the mold so as to form a seat pad integral with the fastener.

An example of such a fastener is a synthetic resin hook-and-loop fastener which has a strip-shaped base portion extending along a surface of a seat pad and is provided with an engaging portion on one surface of the base portion that can engage with an engaged portion of a skin material and an anchor portion on the other surface that is buried within the seat pad. Patent Literature 1 listed below describes that a rail that is recessed in cross section is provided along an inner surface of a mold and a hook-and-loop fastener is engaged with the rail and is thereby retained on the inner surface of the mold.

Figure 4:
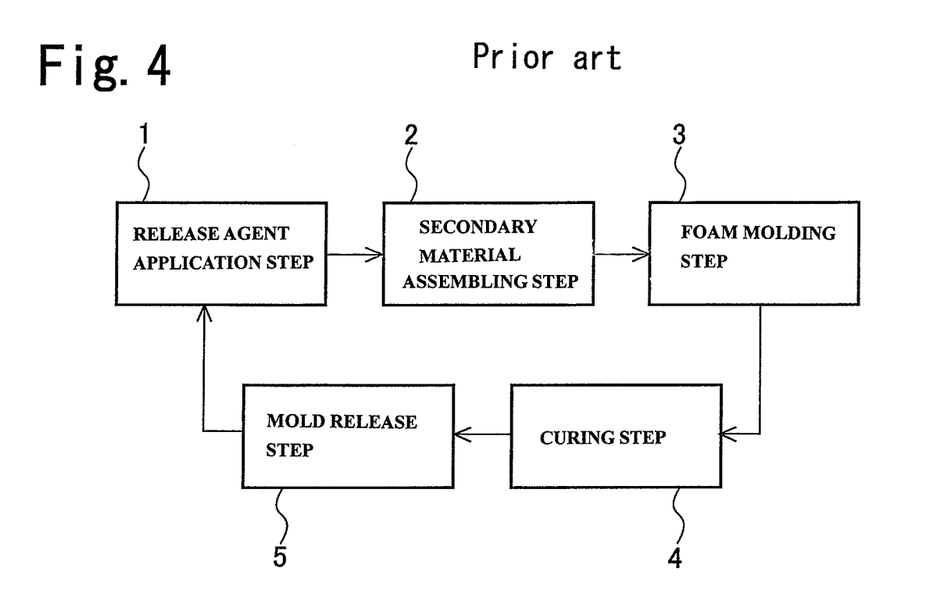
FIG. 4 is a schematic vertical sectional view that illustrates a molding mold in a secondary material assembling step.

FIG. 3 is a schematic vertical sectional view that illustrates such a synthetic resin fastener 7 arranged along an inner surface of a mold 8. Because the synthetic resin fastener 7 has a relatively high flexural rigidity, it is not easy for the fastener 7 to be deformed so as to follow the contour of the inner surface of the mold when the inner surface of the mold 8 is curved. As a result, there is a risk that the fastener 7 will be partially lifted from the inner surface of the mold as illustrated in FIG. 3.

In order to solve such a problem, Patent Literature 1 describes that a plurality of fasteners that have been cut into short lengths in accordance with the curvature radius of the curved surface of the mold are arranged along the curved surface.

Patent Literature 2 listed below describes that a fastener contains a magnetic material and magnets are buried within an inner surface of a mold so as to attract the fastener and cause it to become curved along the curved surface of the mold and to be fixed thereto.

In the production of a foam molded resin article using a mold consisting of an upper mold section and a lower mold section, a foamable resin material such as urethane is supplied into the lower mold section, the mold is clamped, the resin material is foamed and hardened (cured), and the mold is opened to allow the article to be released therefrom.

Figure 3:
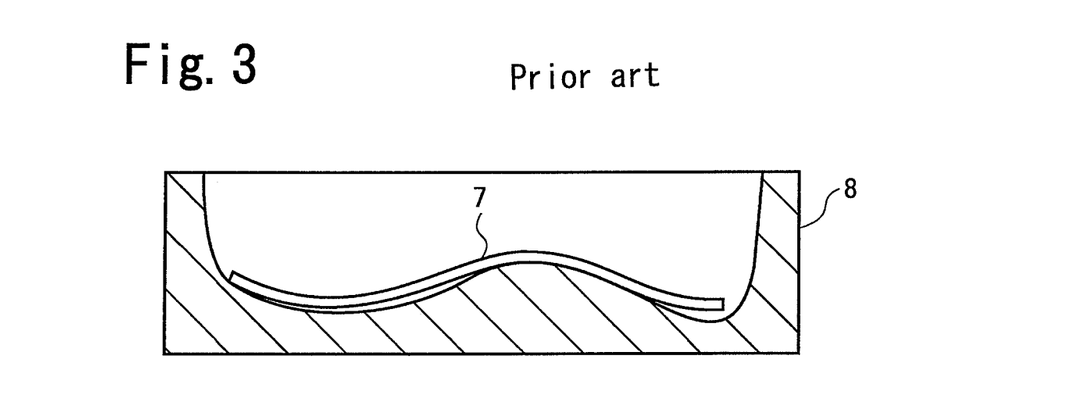
FIG. 3 is a schematic flow diagram that illustrates steps of producing a foam molded resin article.

FIG. 4 is a flow diagram that illustrates a process of producing a foam molded resin article which is integral with a secondary material such as a fastener. This production of a foam molded resin article has a cycle in which a release agent is applied to an inner surface of a cavity of a mold (a release agent application step 1), a secondary material is set within the cavity (a secondary material assembling step 2), a foamable resin material is supplied into the cavity, the mold is clamped and the foamable resin material is heated and foamed (a foam molding step 3), the foamed resin material is cured (a curing step 4), and thereafter the mold is opened and the molded article is released therefrom (a mold release step 5). After the molded article is released from the mold, the process returns to the release agent application step 1 and the next cycle of foam molding starts.

Patent Literatures 3 and 4 listed below describe methods for continuously producing such foam molded resin articles in which the molding molds are sequentially transferred to the step 1 through the step 5 by wagons or a turntable.

CITATION LIST

Patent Literature

PTL 1: Japanese Unexamined Patent Application Publication No. 2003-11137
PTL 2: Japanese Unexamined Patent Application Publication No. 2006-205643
PTL 3: Japanese Unexamined Patent Application Publication No. 2006-62205
PTL 4: Japanese Unexamined Patent Application Publication No. 7-112444

SUMMARY OF INVENTION

Technical Problem

When a plurality of fasteners that have been cut into short lengths in accordance with the curvature radius of a curved surface of a mold are arranged along the curved surface as described in Patent Literature 1, the number of members is significantly increased and the foam molding process becomes very complicated.

When a fastener is fixed while being curved along a curved surface of a mold inner surface by the attractive force of magnets as described in Patent Literature 2, the magnets require a strong force in order to resist the restoring force of the fastener back to the straightly extending shape. On the other hand, a firm fixing of the fastener to the inner surface of the mold causes difficult release from the mold as well as the risk that the fastener will be pulled out from the seat pad during release from the mold.

The present invention is aimed at solving the problems in the art described above. It is an object of the invention to provide a process and a facility for manufacturing a foam molded resin article which facilitate for a secondary material at least partially formed of a synthetic resin to be arranged so as to extend along a curved surface of a mold inner surface, and further to be released from the mold after molding.

Solution to Problem

A first embodiment is directed to a process for manufacturing foam molded resin articles which includes arranging a secondary material at least partially formed of a synthetic resin along an inner surface of a mold and foaming a foamable resin material within the mold so as to produce a foam molded resin article that is integral with the secondary material, in which at least part of the inner surface of the mold has a curved shape and the secondary material is arranged such that at least part of the secondary material extends along the curved surface, wherein the secondary material is heated to a temperature that is not less than a temperature at which the flexural strength and the flexural modulus of the synthetic resin do not exceed predetermined values and such a secondary material is arranged along the inner surface of the mold.

A second embodiment is directed to the process for manufacturing foam molded resin articles according to the first embodiment, wherein the secondary material is heated to a temperature which causes a 10 to 85% decrease in the flexural strength and the flexural modulus of the synthetic resin forming the secondary material relative to values measured when the synthetic resin is at a temperature of 0 to 20° C., and such a secondary material is arranged along the inner surface of the mold.

A third embodiment is directed to the process for manufacturing foam molded resin articles according to the first or second embodiment, wherein the synthetic resin forming the secondary material is a nylon and the secondary material is heated to 30 to 80° C.

A fourth embodiment is directed to the process for manufacturing foam molded resin articles according to any one of the first to third embodiments, wherein the foam molded resin article is a vehicle seat pad and the secondary material is a fastener for fixing a skin material onto a surface of the seat pad.

A fifth embodiment is directed to a facility for manufacturing foam molded resin articles which includes a molding mold and is configured such that a secondary material at least partially formed of a synthetic resin is arranged along an inner surface of the mold and a foamable resin material is foamed within the mold so as to produce a foam molded resin article that is integral with the secondary material, in which at least part of the inner surface of the mold has a curved shape and the secondary material is arranged such that at least part of the secondary material extends along the curved surface, wherein the manufacturing facility has a secondary material heating device that heats the secondary material to a temperature that is not less than a temperature at which the flexural strength and the flexural modulus of the synthetic resin do not exceed predetermined values, and the manufacturing facility is configured such that the secondary material is heated by the secondary material heating device to a temperature that is not less than a temperature at which the flexural strength and the flexural modulus of the synthetic resin do not exceed predetermined values, and such a secondary material is arranged along the inner surface of the mold.

A sixth embodiment is directed to the facility for manufacturing foam molded resin articles according to the fifth embodiment, wherein the secondary material heating device is configured so as to heat the secondary material to a temperature which causes a 10 to 85% decrease in the flexural strength and the flexural modulus of the synthetic resin forming the secondary material relative to values measured when the synthetic resin is at a temperature of 0 to 20° C.

A seventh embodiment is directed to the facility for manufacturing foam molded resin articles according to the fifth or sixth embodiment, wherein the synthetic resin forming the secondary material is a nylon and the secondary material heating device is configured so as to heat the secondary material to 30 to 80° C.

An eighth embodiment is directed to the facility for manufacturing foam molded resin articles according to any one of the fifth to seventh embodiments, wherein the secondary material heating device is located in the vicinity of the mold.

A ninth embodiment is directed to the facility for manufacturing foam molded resin articles according to the eighth embodiment, wherein the secondary material heating device is located within 2 m of the mold.

A tenth embodiment is directed to the facility for manufacturing foam molded resin articles according to any one of the fifth to ninth embodiments, wherein the secondary material heating device includes a container which accommodates the secondary material and has a secondary material retrieval opening, a lid which openably and closably covers the secondary material retrieval opening, and a heater for heating the secondary material in the container to a temperature that is not less than a temperature at which the flexural strength and the flexural modulus of the synthetic resin do not exceed predetermined values.

An eleventh embodiment is directed to the facility for manufacturing foam molded resin articles according to the tenth embodiment, wherein the manufacturing facility includes transfer means for sequentially transferring the mold to a release agent application step in which a release agent is applied to the inner surface of the mold, a secondary material assembling step in which the secondary material is arranged onto the inner surface of the mold, a foam molding step in which a foamable resin material is supplied into the mold, the mold is clamped and the foamable resin material is foamed, a curing step in which the foamed resin material is cured, and a mold release step in which after the foamed resin material is cured, the mold is opened and the molded article is released therefrom, and wherein the secondary material heating device is configured such that the secondary material heating device is moved in combination with the mold by the transfer means and such that the lid is opened when the secondary material heating device is transferred to the secondary material assembling step and thereafter the lid is closed before the secondary material heating device arrives at the foam molding step.

A twelfth embodiment is directed to the facility for manufacturing foam molded resin articles according to any one of the fifth to eleventh embodiments, wherein the foam molded resin article is a vehicle seat pad and the secondary material is a fastener for fixing a skin material onto a surface of the seat pad.

Advantageous Effects of Invention

In the process for manufacturing foam molded resin articles according to the first embodiment, a secondary material at least partially formed of a synthetic resin is heated to a temperature that is not less than a temperature at which the flexural strength and the flexural modulus of the synthetic resin do not exceed predetermined values, and such a secondary material is arranged into a mold. The facility for manufacturing foam molded resin articles according to the fifth embodiment includes a secondary material heating device that heats a secondary material at least partially formed of a synthetic resin to a temperature that is not less than a temperature at which the flexural strength and the flexural modulus of the synthetic resin do not exceed predetermined values; and is configured such that the secondary material is heated by the secondary material heating device to a temperature that is not less than a temperature at which the flexural strength and the flexural modulus of the synthetic resin do not exceed predetermined values, and such a secondary material is arranged along the inner surface of the mold. The secondary material that has been heated to a temperature that is not less than a temperature at which the flexural strength and the flexural modulus of the synthetic resin do not exceed predetermined values is flexibly deformable and can be easily deformed to a shape which follows the curved surface of the mold inner surface. In this manner, the secondary material is prevented from partially lifting from the inner surface of the mold, and the secondary material can be arranged within the mold such that substantially the entirety of the secondary material is in contact with the inner surface of the mold.

This configuration which allows a secondary material to be easily deformed along a curved surface of a mold inner surface eliminates the need for a plurality of secondary materials which have been cut into short lengths in accordance with the curvature radius of the curved surface of the mold inner surface to be arranged along the curved surface as is the case in Patent Literature 1. Thus, the number of operation steps can be reduced. Further, an engagement section provided in the mold inner surface in order to engage with the secondary material may be one which engages with the secondary material with a relatively weak force. That is, the engagement section does not need to engage with the secondary material as strongly as it can resist the restoring force of the secondary material back to the straightly extending shape which is encountered when the secondary material is bent while not being heated to a temperature that is not less than a temperature at which the flexural strength and the flexural modulus of the synthetic resin do not exceed predetermined values. Thus, an engagement section with a simple structure can function sufficiently, and the cost of the mold can be lowered. Further, such an engagement section allows the secondary material to be easily disengaged therefrom at the time of release from the mold. In addition to easy release from the mold, such an engagement section prevents the secondary material from being pulled out from the surface of the molded article at the time of release from the mold.

Specifically, as described in the second and sixth embodiments, the temperature that is not less than a temperature at which the flexural strength and the flexural modulus of the synthetic resin forming the secondary material do not exceed predetermined values is preferably a temperature which causes a 10 to 85% decrease in the flexural strength and the flexural modulus of the synthetic resin relative to values measured when the synthetic resin is at a temperature of 0 to 20° C. (hereinbelow, this range of temperatures will be referred to as normal temperature).

When the synthetic resin forming the secondary material is a nylon as described in the third and seventh embodiments, it is preferable that the secondary material be heated to 30 to 80° C. and arranged into the mold.

As described in the fourth and twelfth embodiments, the present invention is suitably applied to a process and an apparatus for the manufacturing of a vehicle seat pad in which a fastener for fixing a skin material has been integrated on the surface.

As described in the eighth embodiment, it is preferable that the secondary material heating device be located in the vicinity of the mold. Specifically, as described in the ninth embodiment, the secondary material heating device is preferably located within 2 m of the mold. According to this configuration, the secondary material that has been retrieved from the secondary material heating device can be set into the mold before the temperature of the secondary material is lowered to or below a temperature at which the flexural strength and the flexural modulus of the synthetic resin exceed the predetermined values.

According to the tenth embodiment, the container of the secondary material heating device which accommodates the secondary material has a secondary material retrieval opening which is covered with an openable and closable lid. According to this configuration, the lid is opened only when the secondary material is retrieved from the container and the lid is closed during the rest of the time, whereby heat release from the container is suppressed to enable efficient heating of the secondary material as well as high thermal insulation effects. The heater for heating the secondary material in the container may be provided in the container itself or outside the container. For example, an oven or the like may be provided outside the container to perform heating.

According to the eleventh embodiment, foam molding can be carried out continuously by transferring the mold by the transfer means sequentially to the release agent application step, the secondary material assembling step, the foam molding step, the curing step and the mold release step. Herein, the secondary material heating device is configured such that the lid is opened when the secondary material heating device is transferred to the secondary material assembling step and thereafter the lid is closed before the secondary material heating device arrives at the foam molding step. This configuration suppresses heat release from the container during the foam molding step, the curing step, the mold release step and the release agent application step, and prevents a mold release agent from attaching to the secondary material in the container during the release agent application step.

DESCRIPTION OF EMBODIMENTS

Hereinbelow, embodiments according to the present invention will be described with reference to drawings. In the following embodiments, the mold is designed to form a seat pad for constituting, for example, a vehicle seat, and the secondary material is a hook-and-loop fastener for attaching a skin material to a surface of the seat pad. However, the invention is applicable to the production of foamed articles other than seat pads, and the secondary material may be a member other than a hook-and-loop fastener.

Figure 1:
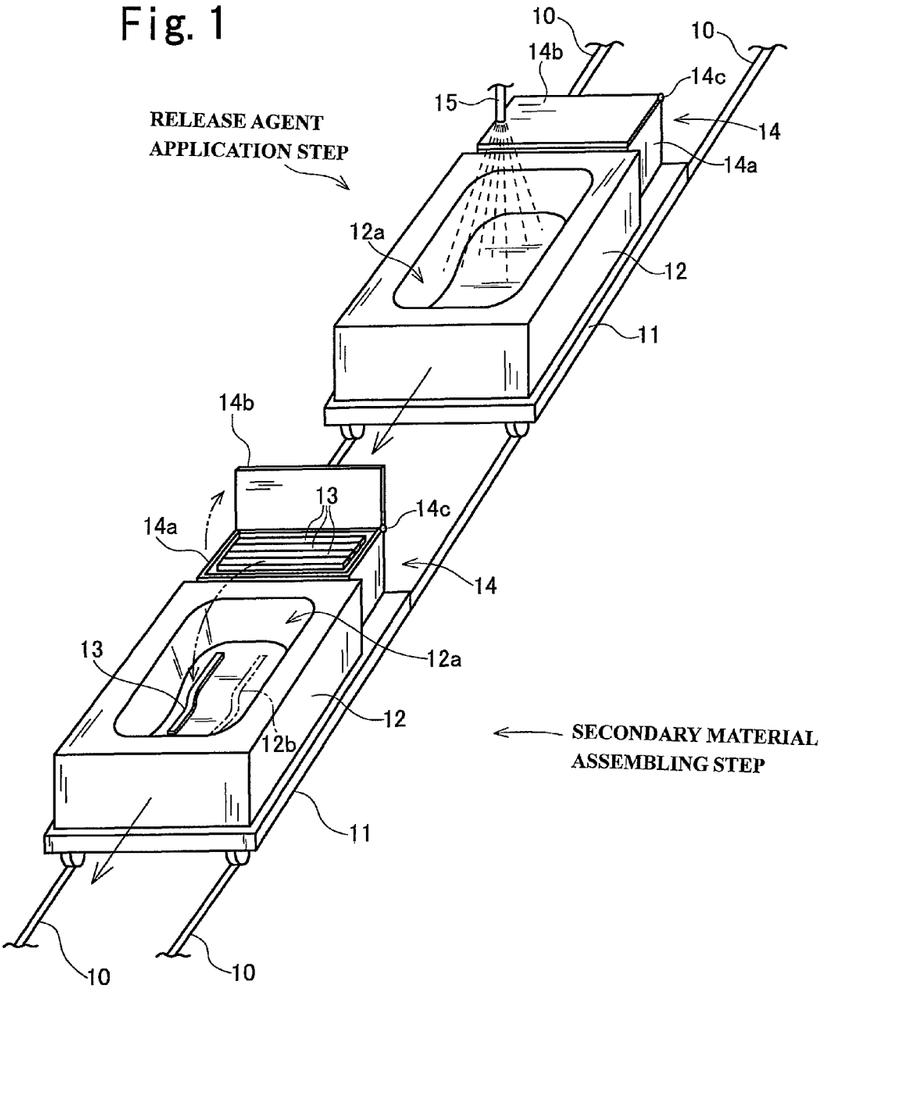
FIG. 1 is a schematic perspective view that illustrates a release agent application step and a secondary material assembling step in a facility for manufacturing foam molded resin articles according to an embodiment.
Figure 2:
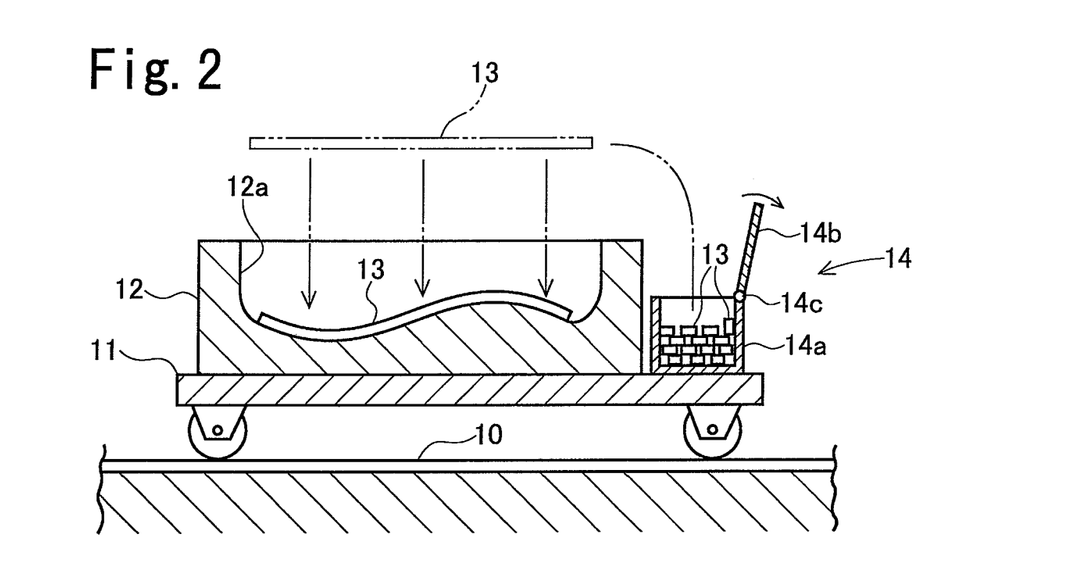
FIG. 2 is a schematic vertical sectional view of a foam molding mold in the secondary material assembling step in the manufacturing facility illustrated in FIG. 1.

FIG. 1 is a schematic perspective view that illustrates a release agent application step and a secondary material assembling step in a facility for manufacturing foam molded resin articles according to an embodiment. FIG. 2 is a schematic vertical sectional view of a molding mold in the secondary material assembling step in the manufacturing facility.

In this embodiment, circuit-shaped rails 10 are laid on the floor of a factory, and a wagon 11 is installed so as to be movable along the rails 10. On the rails 10, a plurality of wagons 11 are installed with spaces therebetween in their extending direction or continuously one after another in their extending direction. Each wagon 11 carries a mold 12 which has a foam molding cavity 12a, a mold opening and closing device (not shown) for opening and clamping the mold 12, a mold heating device (not shown) for heating the mold 12 and thereby foaming a urethane material liquid, a secondary material heating device 14 which contains a secondary material 13 made of a synthetic resin that is to be integrated with a molded article and which can heat the secondary material 13 to a temperature not less than a temperature at which the flexural strength and the flexural modulus of the synthetic resin do not exceed predetermined values, and a controller (not shown) for controlling these devices. The driving system and the controlling method for each wagon 11 are not limited to any particular driving system and controlling method. For example, a system may be configured such that the wagons 11 are connected to each other through a chain and the chain is pulled by an external power source so as to move each wagon 11. Alternatively, each wagon 11 may be configured to be self-movable by a power source installed in each wagon.

In the factory, there are a release agent application zone for performing a release agent application step 1 in which a release agent is applied to an inner surface of the cavity 12a, a secondary material assembling zone for performing a secondary material assembling step 2 in which the secondary material 13 is set within the cavity 12a, a foam molding zone for performing a foam molding step 3 in which a urethane material liquid is supplied into the cavity 12a, the mold is clamped and the urethane material liquid is heated and foamed, a curing zone for performing a curing step 4 in which the foamed urethane is hardened (cured), and a mold release zone for performing a mold release step 5 in which after the urethane is hardened, the mold is opened and the molded article is released from the mold. The rails 10 extend so as to run through the release agent application zone, the secondary material assembling zone, the foam molding zone, the curing zone and the mold release zone in this order and thereafter return to the release agent application zone.

The mold 12 has an upper mold section and a lower mold section. FIGS. 1 and 2 illustrate the lower mold section alone and the upper mold section is omitted. In this embodiment, the mold 12 is designed to form a seat pad used in, for example, a vehicle seat, and the secondary material 13 is a hook-and-loop fastener made of a synthetic resin that is to be engaged with a skin material attached to the surface of the seat pad. However, the secondary material 13 may be a member other than a hook-and-loop fastener. Further, the entirety of the secondary material 13 may be composed of a synthetic resin, or a part thereof may be composed of a synthetic resin and the remaining part may be composed of a material other than a synthetic resin. For example, the secondary material 13 may be a fibrous material impregnated with a synthetic resin, or a fibrous material covered with a synthetic resin. Preferred examples of the synthetic resins include nylons and polypropylenes.

As illustrated in FIG. 2, the cavity 12a of the mold 12 (the lower mold section) has a curved bottom surface. The reference sign 12b in FIG. 1 (the region defined by a two-dot chain line) indicates a secondary material arrangement scheduled region on the bottom surface of the cavity 12a. In this secondary material arrangement scheduled region 12b, an engagement section (not shown) such as a groove or a protrusion that is to engage with the secondary material 13 is provided. In the secondary material arrangement scheduled region 12b, the secondary material 13 is arranged along the bottom surface of the cavity 12a and is engaged with the engagement section. A secondary material 13 may be fitted also to the inner surface of the cavity of the upper mold section of the mold 12.

The mold opening and closing device is configured so as to hold the mold 12 open by separating the upper mold section from the lower mold section when the wagon 11 is running through the mold release zone, the release agent application zone and the secondary material assembling zone, and to hold the mold 12 clamped by joining the upper mold section to the lower mold section when the wagon 11 is running through the foam molding zone and the curing zone. The driving system and the controlling method for the mold opening and closing device are not limited to any particular driving system and controlling method. For example, the power source for approximating and separating the upper mold section relative to the lower mold section may be any of various power sources such as the rotational driving force of an electric motor, gas pressure, hydraulic pressure or spring pressure. A configuration may be adopted in which a position detection sensor is provided on, for example, the wagon 11 or the rails 10 that can detect which zone and which operation stage the wagon 11 is undergoing, and the mold opening and closing device is operated so as to open or clamp the mold in accordance with the detected position information output from the position detection sensor. Alternatively, such an automated mold opening and closing device may be omitted and the mold 12 may be opened and closed manually.

The mold heating device is not limited to any particular system. Preferred examples of the mold heating device include an external oven and a warm water circulation pipe.

The secondary material heating device 14 includes a heating container 14a having an open shape which accommodates the secondary materials 13 and has a secondary material retrieval opening in its upper face, a lid 14b which covers the secondary material retrieval opening, a heater (not shown) for heating the inside of the heating container 14a to a temperature that is not less than a temperature at which the flexural strength and the flexural modulus of the synthetic resin forming the secondary material 13 do not exceed predetermined values, and a lid opening and closing device (not shown) for opening and closing the lid 14b. The heating container 14a has a volume enough to accommodate a plurality (for example, 10 to 300) of secondary materials 13. The outer surface of the heating container 14a and that of the lid 14b have a heat resistant coating in order to lower thermal conductivity. The lid 14b is attached to the heating container 14a through a hinge 14c so as to function as an openable and closable door. The lid opening and closing device is configured so as to automatically open the lid 14b when the wagon 11 is transferred from the release agent application zone to the secondary material assembling zone and automatically close the lid 14b when the wagon 11 is transferred from the secondary material assembling zone toward the foam molding zone. The lid 14b is preferably closed at a time between immediately after the secondary material 13 is retrieved from the heating container 14a and until the wagon 11 arrives at the foam molding zone. The driving system and the controlling method for the lid opening and closing device are not limited to any particular driving system and controlling method. The heater of the secondary material heating device 14 is not limited to any particular system. For example, the power source for the lid opening and closing device may be any of various power sources such as the rotational driving force of an electric motor, gas pressure, hydraulic pressure or spring pressure similarly to that used in the mold opening and closing device. A configuration may be adopted in which the lid opening and closing device is operated so as to open or close the lid in accordance with the detected information output from the position detection sensor. Further, a configuration may be adopted in which a retrieval detection sensor is provided which can detect the retrieval of the secondary material 13 from the secondary material retrieval opening and the lid 14b is closed in accordance with the detected information output from the retrieval detection sensor. Alternatively, such an automated lid opening and closing device may be omitted and the lid 14b may be opened and closed manually. Preferred examples of the heater include an external oven and a warm water circulation pipe.

A plurality of secondary materials 13 are accommodated in the heating container 14a of the secondary material heating device 14 and are heated by the heater to a temperature that is not less than a temperature at which the flexural strength and the flexural modulus of the synthetic resin forming the secondary material 13 do not exceed predetermined values. In detail, the temperature that is not less than a temperature at which the flexural strength and the flexural modulus of the synthetic resin forming the secondary material 13 do not exceed predetermined values is preferably a temperature which causes a 10 to 85% decrease, in particular a 20 to 70% decrease in the flexural strength and the flexural modulus of the synthetic resin relative to values measured when the synthetic resin is at a normal temperature (0 to 20° C.). For example, when the synthetic resin forming the secondary material 13 is a nylon, this heating temperature is preferably 30 to 80° C., and more preferably 40 to 70° C.

As illustrated in FIGS. 1 and 2, the secondary material heating device 14 is provided on the wagon 11 and adjacent to the mold 12. The distance between the secondary material heating device 14 and the mold 12 is preferably not more than 2 m, and more preferably from 0 to 0.5 m. This distance ensures that after the secondary material 13 is retrieved from the heating container 14a, the secondary material 13 can be set within the cavity 12a before the temperature of the secondary material 13 is lowered to or below a temperature at which the flexural strength and the flexural modulus of the synthetic resin exceed the predetermined values.

Hereinbelow, there will be described procedures for manufacturing foam molded resin articles with the foam molded resin article manufacturing facility that is configured as described above.

In the release agent application zone, a release agent is applied from a release agent spray nozzle 15 to the inner surface of the cavity 12a of the mold 12. The wagon 11 is then transferred to the secondary material assembling zone along the rails 10. In the release agent application zone, the lid 14b of the secondary material heating device 14 remains closed. When the wagon 11 enters the secondary material assembling zone, the lid 14b of the secondary material heating device 14 is opened. A worker or a robot worker retrieves the secondary material 13 from the heating container 14a, arranges the secondary material 13 in the secondary material arrangement scheduled region 12b in the cavity 12a and causes it to engage with the engagement section. Thereafter, the wagon 11 is transferred to the foam molding zone. The lid 14b of the secondary material heating device 14 is closed before the wagon 11 arrives at the foam molding zone. In the foam molding zone, a urethane material liquid is supplied into the cavity 12a, subsequently the mold opening and closing device is operated so as to clamp the mold 12, and thereafter the mold heating device is operated so as to heat the mold 12 whereby the urethane material liquid reacts and foams. Thereafter, the wagon 11 is moved to the curing zone where the urethane is hardened. After the urethane is hardened, the wagon 11 is transferred to the mold release zone, the mold opening and closing device is operated so as to open the mold, and the molded article is released from the mold. After the article is released from the mold, the wagon 11 is returned to the release agent application zone and undergoes a next cycle of foam molding.

In the method and the facility for manufacturing foam molded resin articles according to the invention, the secondary material 13 made of a synthetic resin is heated to a temperature that is not less than a temperature at which the flexural strength and the flexural modulus of the synthetic resin do not exceed predetermined values, and such a secondary material is arranged into the cavity 12a. The secondary material 13 that has been heated to a temperature not less than a temperature at which the flexural strength and the flexural modulus of the synthetic resin do not exceed predetermined values is flexibly deformable. Such a secondary material 13 can be easily deformed into a shape which follows the curved surface of the bottom surface of the cavity 12a. In this manner, the secondary material 13 is prevented from partially lifting from the bottom surface of the cavity 12a, and the secondary material 13 can be arranged such that substantially the entirety of the secondary material 13 is in contact with the bottom surface of the cavity 12a.

This configuration which allows the secondary material 13 to be easily deformed along the curved surface of the bottom surface of the cavity 12a eliminates the need for a plurality of secondary materials 13 which have been cut into short lengths in accordance with the curvature radius of the curved surface of the cavity 12a to be arranged along the curved surface as is the case in Patent Literature 1. Thus, the number of operation steps can be reduced.

Because the secondary material 13 can be easily deformed to a shape which follows the curved surface of the bottom surface of the cavity 12a, the secondary material engagement section provided in the cavity 12a may be one which engages with the secondary material 13 with a relatively weak force. That is, this engagement section does not need to engage with the secondary material 13 as strongly as it can resist the restoring force of the secondary material 13 back to the straightly extending shape which is encountered when the secondary material 13 is bent while not being heated to a temperature that is not less than a temperature at which the flexural strength and the flexural modulus of the synthetic resin do not exceed predetermined values. For example, the engagement force may be such that the secondary material 13 is prevented from being misaligned by the flow of urethane in the cavity 12a during foam molding. Thus, an engagement section with a simple structure can function sufficiently, and the cost of the mold can be lowered. Further, such an engagement section allows the secondary material 13 to be easily disengaged therefrom at the time of release from the mold. In addition to easy release from the mold, such an engagement section prevents the secondary material 13 from being pulled out from the surface of the molded article at the time of release from the mold.

In the facility for molding foam molded resin articles, the secondary material heating device 14 is provided in the vicinity of the mold 12 (within 2 m of the mold). According to this configuration, the secondary material 13 that has been retrieved from the heating container 14a can be set within the cavity 12a before the temperature of the secondary material 13 is lowered to or below a temperature at which the flexural strength and the flexural modulus of the synthetic resin exceed the predetermined values.

In this embodiment, the secondary material heating device 14 has the lid 14b which covers the secondary material retrieval opening of the heating container 14a. As described hereinabove, the lid 14b is opened substantially only when the secondary material 13 is retrieved from the heating container 14a and the lid is closed during the rest of the time. According to this configuration, heat release from the heating container 14a is suppressed to enable efficient heating of the secondary material 13 as well as high thermal insulation effects. Further, because the lid 14b remains closed in the release agent application zone, a release agent sprayed from the release agent spray nozzle 15 is prevented from attaching to the secondary material 13 in the heating container 14a.

In the aforementioned embodiments, the secondary material heating device 14 is located adjacent to the mold 12 on each wagon 11. However, the arrangement of the secondary material heating device 14 is not limited thereto. For example, the secondary material heating device 14 may be provided in the secondary material assembling zone as long as the secondary material 13 can be transferred from the secondary material heating device 14 into the cavity 12a of the mold 12 quickly (before the temperature of the secondary material 13 is lowered to or below a temperature at which the flexural strength and the flexural modulus of the synthetic resin exceed the predetermined values). Such a configuration results in a simplified structure of each wagon 11. Further, because the weight of each wagon 11 is reduced, a wagon driving device with a relatively low output can function sufficiently. Thus, the facility cost is reduced.

In the aforementioned embodiments, the mold 12 is mounted on the wagon 11 which is moved along the rails 10. However, the means for transferring the mold 12 is not limited thereto, and any of various transfer means such as an endless conveyer or a turntable may be used.

The embodiments described hereinabove are only illustrative and embodiments other than the aforementioned embodiments are possible in the invention.

Although the present invention has been described in detail with respect to some specific embodiments, the skilled person will appreciate that various modifications are possible within the spirit and the scope of the invention.

This application is based upon a Japanese patent application filed on Aug. 19, 2009 (Japanese Patent Application No. 2009-190280), the entire contents of which are incorporated herein by reference.

The invention claimed is:

1. A process for manufacturing a vehicle seat pad comprising arranging a fastener at least partially formed of a synthetic resin along an inner surface of a mold and foaming a foamable resin material within the mold so as to produce the vehicle seat pad that is integral with the fastener for fixing a skin material onto a surface of the seat pad,
   at least part of the inner surface of the mold has a curved shape and the fastener is arranged such that at least part of the fastener extends along the curved surface in the process for manufacturing the vehicle seat pad,
   wherein the fastener is heated to a temperature which causes a 10 to 85% decrease in the flexural strength and the flexural modulus of the synthetic resin forming the fastener relative to values measured when the synthetic resin is at a temperature of 0 to 20° C., and such a fastener is arranged along the inner surface of the mold.

2. The process for manufacturing a vehicle seat pad according to claim 1, wherein the synthetic resin forming the fastener is a nylon and the fastener is heated to 30 to 80° C.

3. A facility for manufacturing a vehicle seat pad which comprises a molding mold, and
   is configured such that a fastener at least partially formed of a synthetic resin is arranged along an inner surface of the mold and a foamable resin material is foamed within the mold so as to produce the vehicle seat pad that is integral with the fastener for fixing a skin material onto a surface of the seat pad,
   at least part of the inner surface of the mold has a curved shape and the fastener is arranged such that at least part of the fastener extends along the curved surface in the facility for manufacturing the vehicle seat pad,
   wherein the manufacturing facility has a fastener heating device that heats the fastener to a temperature which causes a 10 to 85% decrease in the flexural strength and the flexural modulus of the synthetic resin forming the fastener relative to values measured when the synthetic resin is at a temperature of 0 to 20° C., and
   the manufacturing facility is configured such that the fastener is heated by the fastener heating device to a temperature which causes a 10 to 85% decrease in the flexural strength and the flexural modulus of the synthetic resin forming the fastener relative to values measured when the synthetic resin is at a temperature of 0 to 20° C., and such a fastener is arranged along the inner surface of the mold.

4. The facility for manufacturing a vehicle seat pad according to claim 3, wherein the synthetic resin forming the fastener is a nylon and the fastener heating device is configured so as to heat the fastener to 30 to 80° C.

5. The facility for manufacturing a vehicle seat pad according to claim 3, wherein the fastener heating device is located in the vicinity of the mold.

6. The facility for manufacturing a vehicle seat pad according to claim 5, wherein the fastener heating device is located within 2 m of the mold.

7. The facility for manufacturing a vehicle seat pad according to claim 3, wherein the fastener heating device includes
   a container which accommodates the fastener and has a fastener retrieval opening,
   a lid which openably and closably covers the fastener retrieval opening, and
   a heater for heating the fastener in the container to a temperature which causes a 10 to 85% decrease in the flexural strength and the flexural modulus of the synthetic resin forming the fastener relative to values measured when the synthetic resin is at a temperature of 0 to 20° C.

8. The facility for manufacturing a vehicle seat pad according to claim 7, wherein the manufacturing facility includes
   a wagon which is moved along rails for sequentially transferring the mold to
   a release agent application step in which a release agent is applied to the inner surface of the mold,
   a fastener assembling step in which the fastener is arranged onto the inner surface of the mold,
   a foam molding step in which a foamable resin material is supplied into the mold, the mold is clamped and the foamable resin material is foamed,
   a curing step in which the foamed resin material is cured, and
   a mold release step in which after the foamed resin material is cured, the mold is opened and the molded article is released therefrom, and wherein
   the fastener heating device is configured such that the fastener heating device is moved in combination with the mold by the wagon and
   the fastener heating device is configured such that the lid is opened when the fastener heating device is transferred to the fastener assembling step and thereafter the lid is closed before the fastener heating device arrives at the foam molding step.

* * * * *